United States Patent Office 3,717,697
Patented Feb. 20, 1973

3,717,697
PROCESS FOR PURIFICATION OF TUNGSTEN
William Clarence Gillchriest, Los Angeles, Calif., assignor to International Development Labs, Los Angeles, Calif.
No Drawing. Filed Aug. 6, 1970, Ser. No. 61,812
Int. Cl. C01g 41/00
U.S. Cl. 423—58
12 Claims

ABSTRACT OF THE DISCLOSURE

A process for removing tungsten from scheelite ore by first treating the ore with an oxy acid that forms an insoluble calcium salt and forms a soluble complex with the tungstate anion, or hydrogen fluoride, or a sodium or potassium salt of the oxy acid or hydrogen fluoride, or mixtures thereof. The scheelite ore is treated at a pH of about −1 to about 14 with agitation and using slight heating if desired until the tungsten is substantially removed from the ore as a soluble complex in the supernatant liquid. The supernatant liquid may then be treated with a water soluble monovalent sulfide at a pH of less than about 7 to precipitate the tungsten as an insoluble complex. The sulfide may be heated in air to convert it to an oxide. The supernatant liquid, if it contains an oxy acid as defined, may also be treated with a soluble aluminum salt in the presence of phosphate or pyrophosphate ions or mixtures thereof to precipitate the tungsten as an insoluble complex. The complex may be resolubilized in acid media and treated with a soluble monovalent sulfide to precipitate the tungsten as an insoluble sulfide which may be heated in air to convert it to an oxide.

This invention pertains to a process for separation of tungsten from scheelite ore. More specifically, the invention pertains to a process for separation of tungsten from scheelite ore in which the tungsten is concentrated from the ore by treatment of the ore with a specified oxy acid, hydrogen fluoride, the sodium or potassium salts of the oxy acid or the hydrogen fluoride, or mixtures thereof.

Tungsten is a commonly used metal of commerce and one which is, at the present, quite difficult to extract from its ores. Previous methods for the separation of tungsten have been time consuming and costly and frequently have involved treatment of the ore at high temperatures for extensive periods of time.

In accord with the present invention, I have devised a new process for separating tungsten from its ore which does not require treatment of the ore for extensive periods of time at high temperatures. Thus, my process is considerably cheaper than presently available methods for purification of tungsten.

A principal source of tungsten in nature is scheelite ore. Tungsten, in this form, occurs as calcium tungstate in admixture with other minerals, rock, etc. In treating scheelite ore in accord with my process, the ore is first preferably ground to a finely divided state to increase the surface area available for subsequent reaction. While the particle size of the ore is not critical, I have found that a size of about −120 mesh (U.S. Sieve Series) works well.

As an optional step, the finely divided ore is then roasted in air or an oxidizing atmosphere for approximately one hour. During the roasting operation, volatile materials are driven off from the ore. This has been found to increase the reactivity of the ore in the subsequent stages of my process. The time and temperature of roasting may be varied, for example, by roasting within the range of about 1100° F. to about 1300° F. for time periods of about 45 minutes to about an hour and 15 minutes. The particular roasting conditions employed may be varied in the practice of my process and the roasting step may be eliminated entirely. I prefer to use the roasting step, however, because it has been found that its use improves the reactivity of the ore during the subsequent process steps.

The ground and preferably roasted ore is then treated with an oxy acid or the sodium or potassium salt thereof, in combination with water. Also, hydrogen fluoride, or its sodium or potassium salt may be employed in lieu of the oxy acid or its sodium or potassium salt. During reaction between the acid or salt, as aforestated, and the scheelite ore, an insoluble calcium salt is formed together with a soluble tungsten complex. The soluble tungsten complex is then removed by separating off the supernatant liquid from the reaction vessel for further treatment.

During the course of the reaction between the acid and the scheelite ore, the pH of the reaction medium may be maintained within the range of about −1 to about 14. The reaction system is agitated and the time required for the reaction may range up to about 24 hours at a reacton pH of about 7 or higher. Less time is required for the reaction, e.g., down to as low as about 4 to about 6 hours when the reaction is conducted at a pH less than about 7.

For each mole of calcium tungstate in the scheelite ore, there is required about one-tenth to one-third mole of the anion of the oxy acid. However, in order to force the reaction to completion, I find it desirable to use the oxy acid in excess quantities and typically the acid is employed as a 1.0 molar solution. By way of example, I found that 250 mls. of a 1.0 molar acid solution was suitable for reaction with 100 grams of ore.

When the acid employed is hydrogen fluoride or a sodium or potassium salt of hydrogen fluoride, I also find it desirable to employ the fluoride acid or salt in considerable excess in order to force the reaction to completion. In using either an oxy acid or fluoride for reaction with the scheelite ore, the course of the reaction may be conveniently followed by the removing an aliquot from the reaction mixture and analyzing it to determine the quantity of tungsten remaining in the ore. One such method is reported in the literature at page 104 of "Mineral Recognition," by I. Vanders and D. F. Kerr, John Wiley & Sons, Inc., New York, N.Y. (1967). Also, the course of the reaction can be followed by measuring the fluorescence of an aliquot from the reaction mixture (excited at a frequency of 280–300 nanometers) with an Aminco-Bowman Spectrophosphofluorimeter. My process results in removal of the tungsten from the scheelite ore to the extent that its presence in the ore can no longer be detected by an emission spectrograph of the ore or fluorescence measurements of the ore as described above.

During the course of the above described reaction between an oxy acid, oxy acid salt, hydrogen fluoride, fluoride salt, or mixtures thereof and the scheelite ore, the reaction mass is heated slightly in order to promote the reaction rate. I have found that, for example, temperatures in the order of about 25° C. to about 75° C. are quite suitable for the reaction. However, the temperature employed is not critical to the reaction.

Not all oxy acids may be employed for reaction with scheelite ore in the manner defined above. The term "oxy acid" refers, of course, to an acid whose anion contains oxygen. This, by way of illustration, includes such acids as phosphoric acid, pyrophosphoric acid, oxalic acid, fumeric acid, succinic acid, and the like. As a first test for determining whether a particular oxy acid is suitable for use in my process in the manner described above, the oxy acid must form an insoluble calcium salt. As a simple test for determining the ability of the acid to form an insoluble calcium salt, a one molar aqueous solution of the oxy acid or its potassium or sodium salt is made up (solution 1). There is then formed a one molar solution of calcium carbonate (solution 2). Following this, an equal volume of solution 1 is added to solution 2 and the temperature of the mixture is maintained at about 50° C. with agitation for a period of about 24 hours. If an insoluble calcium salt of the acid is formed, this is evidence that the oxy acid meets one of the criteria for use in my process.

The second criteria for the oxy acid is that it will form a soluble complex with the tungstate anion. To determine this, a one molar solution (solution 3) of sodium tungstate is reacted with a one molar solution of the oxy acid or oxy acid salt for about 24 hours at a pH of 2 to 14. If the reaction product is soluble in the aqueous reaction system, this is evidence that the oxy acid meets the second criteria for use in my process.

As described above, the function of the oxy acid, when used in my process, is to form an insoluble precipitate with the calcium in the scheelite ore while at the same time forming a soluble complex with tungsten which is removed with the supernatant liquid from the reaction vessel.

The function of the hydrogen fluoride or its sodium or potassium salt in my process is similar to that of the oxy acid or its salts. The fluoride forms insoluble calcium fluoride with the calcium in the scheelite ore. Also, the fluoride forms a soluble tungsten-containing complex which is removed with the supernatant liquid.

As described above, the supernatant liquid resulting from reaction between the acid and the scheelite ore contains tungsten in the form of a soluble complex. The supernatant liquid is removed from the precipitated calcium salt and is then treated further in my process. The supernatant liquid may be treated in either of two ways in accord with my process and, for purposes of identification, the two alternative methods are identified as Method A and Method B.

In Method A, the pH of the supernatant liquid is either maintained at or raised to at least about 6 or higher. If the pH of the supernatant liquid is less than about 6, it may be increased by adding an alkali-containing base such as sodium hydroxide or potassium hydroxide to the supernatant liquid. Following this, an aluminum salt which is soluble in water is then added to the system. Typical of such aluminum salts are aluminum chloride, aluminum nitrate, aluminum perchlorate, aluminum acetate, and aluminum sulfate. The reaction mixture must also contain phosphate or pyrophosphate anions. These anions will be present if the oxy acid employed for reaction with the scheelite ore was phosphoric acid, pyrophosphoric acid, the sodium or potassium salts thereof, or a mixture of any of these. However, if the oxy acid employed for reaction with the scheelite ore does not contain a phosphate or pyrophosphate anion, it is necessary that a source of phosphate or pyrophosphate anions be added to the reaction mixture. The source of phosphate or pyrophosphate anions, e.g., phosphoric acid, sodium phosphate, potassium phosphate, pyrophosphoric acid, sodium pyrophosphate, or potassium pyrophosphate, is preferably added to the reaction mixture prior to addition of the soluble aluminum salt. The quantity of added phosphate or pyrophosphate anion is sufficient to displace the oxy acid anion (if other than a phosphate or pyrophosphate) from the tungsten-containing complex. By way of example, I have found the addition of a phosphate or pyrophosphate source in an amount sufficient to provide a 0.1 molar concentration of phosphate or pyrophosphate anions in the reaction mixture to be satisfactory.

Following addition of the aluminum salt, the reaction mixture is agitated for about 15 minutes at ambient temperature and a precipitate is formed. The reaction conditions employed in this phase of my process are not critical providing that the pH is above 6, as previously stated. As a result of the reaction, the tungsten is precipitated in the form of an aluminum-tungsten-containing complex.

The aluminum-tungsten-containing complex, which is removed as a precipitate from the reaction vessel, may be further treated to form a soluble complex of tungsten by increasing the acidity to a pH of about 3. During the acidification step, the reaction mixture may be agitated at ambient temperatures.

After the tungsten has been placed into aqueous solution at a pH of about 2 to about 3, a water soluble, monovalent sulfide such as sodium sulfide may be added to the reaction system which precipitates the tungsten therefrom in the form of a tungsten-sulfur complex.

Method A, as described above, is used only when the soluble tungsten-containing complex has been formed by reaction of an oxy acid or salt, as described previously, with the scheelite ore. Under these circumstances, the reaction system will contain an oxy acid or a mixture thereof with a fluoride.

The supernatant liquid is separated from the tungsten-sulfur complex which separates out as an insoluble precipitate in the manner described previously. The tungsten-sulfur complex may then be heated at temperatures ranging from about 75° C. to about 100° C. This decomposes the complex and drives off the sulfur as hydrogen sulfide gas. The tungsten remains behind in the form of a tungsten oxide. At this point, my process for purification of tungsten is complete.

There are numerous known ways of removing metallic tungsten from its oxides. For example, the tungsten oxide may be reacted with gaseous fluorine to form tungsten hexafluoride, which is a gas at ambient temperatures, e.g., 20–25° C. This material may then be reduced with hydrogen to form metallic tungsten and gaseous hydrogen fluoride. Several known methods for removing tungsten from its oxides are described in the following literature references:

Belozerskri Krichewsskya, Chem. Abstracts, page 1961, column 4302H (1959); and

Osley, J. H.; Beidler, E. A.; Blocker, J. M.; Lyons, C. J.; Park, R. S. and Pearson, J. M.—Fifth Plansee Seminar, Springer Wein, 278 (1964–1965).

As stated previously, there is an alternative Method B for treatment of the supernatant liquid containing the soluble tungsten complex resulting from reaction of scheelite ore with the oxy acid or fluoride or the sodium or potassium salts of either, as described previously. In accord with Method B, the pH of the supernatant liquid is simply reduced to a pH of less than about 7 and a water soluble monovalent sulfide is added to the reaction medium. Typical of such sulfides are sodium sulfide, potassium sulfide, ammonium sulfide, and the like. This precipitates the tungsten in the form of an insoluble tungsten-sulfur complex which may then be treated in accord with the procedure described in Method A to obtain a tungsten oxide.

As described, Method A is quite advantageous for treatment of a basic tungsten-containing ore. The basic ore may first be treated with an oxy acid in the manner described and the supernatant liquid treated according to Method A. During this entire procedure, the reaction system can be kept basic which permits separation of the tungsten from the ore without neutralization of the basic materials in the ore. Method B, on the other hand, is advantageous for treatment of acid ores since it permits separation of the tungsten in an acid system which does not require neutralization of the acidic materials in the ore. My process may also find application for separation of tungsten from wolframite ore, which is generally treated in a basic system.

In order to more fully illustrate my process, reference is made to the following examples in which all parts and percentages are by weight, unless otherwise indicated.

EXAMPLE I

One hundred grams of scheelite ore ground to —120 mesh (U.S. Sieve Series) was weighed into a reaction vessel. There was then added about 250 mls. of a 15 percent by volume solution of phosphoric acid and the pH was adjusted to about 1. The reaction mixture was then stirred with a magnetic stirrer for 24 hours under ambient conditions. A sample of the extracted ore was analyzed by fluorescence analysis and the results indicated that all of the tungsten had been removed. Following this, the supernatant liquid containing the tungsten in the form of a soluble tungsten complex was removed from the reaction vessel. An aliquot of the supernatant liquid was reacted with a standard one molar solution of stannous chloride in concentrated hydrochloric acid and there resulted the characteristic tungsten blue coloration. This is a standard analytical procedure reported in "Tungsten," K. C. Li and C. Wong, Monograph Edition, Series 130, 3rd ed., Reynolds Publishing Co. (1955).

When Example I was repeated using a 13 percent by volume solution of fumeric acid adjusted to a pH of about 1 with hydrochloric acid in lieu of the phosphoric acid, the tungsten was removed from the ore satisfactorily as a soluble complex in the supernatant liquid. Similarly, the use of a one molar solution of pyrophosphoric acid resulted in effective extraction of tungsten from the ore as a soluble complex in the supernatant liquid.

When Example I is repeated using the sodium or potassium salts of phosphoric acid, fumeric acid, or pyrophosphoric acid adjusted to a pH of about 1 by the addition of hydrochloric acid, the tungsten in the ore is extracted satisfactorily in the form of a soluble complex in the supernatant liquid. Also, extraction of the tungsten results when the reaction medium is basic and the sodium or potassium salts of the oxy acid are employed.

EXAMPLE II

To one hundred grams of scheelite ore ground to —120 mesh (U.S. Sieve Series) was added about 250 mls. of a 10 percent by volume solution of hydrofluoric acid. After stirring magnetically for 24 hours under ambient conditions, the supernatant liquid was analyzed by the stannous chloride method described in Example I and found to contain tungsten. The extracted ore was analyzed by emission spectrograph and emission fluorescence which indicated the absence of tungsten.

When Example II is repeated using potassium fluoride or sodium fluoride in lieu of hydrogen fluoride, satisfactory results are obtained. In using the fluoride salts, the pH of the reaction mixture may, if desired, be adjusted to about 1 by addition of an acid such as concentrated hydrochloric acid.

In performing the experimental work described in Examples I and II, the ore may be and preferably is roasted prior to the extraction procedure since this has been found to improve its reactivity during the extraction.

EXAMPLE III

To the supernatant liquid resulting from extraction of 100 grams of scheelite ore with about 250 mls. of a 10% by weight aqueous solution of sodium fluoride adjusted to a pH of 1 with concentrated hydrochloric acid as in Example II was added about 200 grams of finely divided sodium sulfide. After agitating the reaction mixture, the tungsten precipitated as a tungsten sulfide. On heating of the precipitate in air, it is converted to tungsten oxide.

EXAMPLE IV

To the supernatant liquid containing tungsten in the form of a soluble complex resulting from Example I was added finely divided sodium sulfide with agitation. The tungsten precipitated from solution as a tungsten sulfide. On heating the tungsten sulfide in air, it is converted to a tungsten oxide.

In separating tungsten from solution using the procedure of Example IV, the pH of the solution can be controlled by the nature of the acid or acid salt used for the initial extraction of tungsten from the ore. For example, the acid salt used for the initial extraction may be $NaH_2PO_4$, $Na_2HPO_4$ or $Na_3PO_4$. As the number of alkali atoms in the salt is increased, the basicity of the supernatant liquid used as the starting material in Example IV may be increased. On precipitation of the tungsten using either the procedure of Example III or that of Example IV, the remaining liquid may be recycled to the preceding step of my process and used for the extraction of tungsten from the ore.

When Examples III and IV are repeated using water soluble monovalent sulfides other than sodium sulfide, the tungsten is satisfactorily precipitated as an insoluble sulfide complex. Thus, for example, either potassium sulfide or ammonium sulfide may be substituted for the sodium sulfide.

EXAMPLE V

One hundred grams of —120 mesh scheelite ore was extracted in the manner described in Example I with a one molar aqueous solution of $Na_2HPO_4$. To the supernatant liquid at a pH of 6 or above was added finely divided aluminum chloride with agitation. An insoluble white gel precipitate was formed which contained the tungsten in the form of an insoluble complex. The precipitate is separated from the reaction mixture and resolubilized in a smaller volume of water by adjusting the pH to less than about 7. On addition of sodium sulfide as described in Examples III and IV, the tungsten is precipitated as an insoluble tungsten sulfide which may be heated in air and converted to the oxide.

On repeating Example V using the water soluble aluminum compounds, e.g., aluminum nitrate, aluminum perchlorate, aluminum acetate or aluminum sulfate, the tungsten is precipitated satisfactorily as an insoluble complex. This result is obtained when the supernatant liquid employed as the starting material contains any oxy acid having the characteristics defined previously such as oxalic acid, succinic acid, fumeric acid and the like. However, as described previously, it is necessary that phosphate or pyrophosphate anions be present in order to utilize Method A. If the oxy acid used for reaction with the scheelite ore does not contain one of these anions, a source of the anion must be added in the performance of Method A.

As demonstrated by the foregoing examples and specification, my method is a versatile one which provides the removal of tungsten from its ore in either a basic or acidic medium without treatment of the ore for extensive periods of time at high temperatures.

What is claimed is:

1. A process for removing tungsten from scheelite ore, said process comprising contacting scheelite ore in a finely divided state in an aqueous medium with hydrogen fluoride or the sodium or potassium salts thereof at a pH ranging from about —1 to about 14 for a sufficient time to remove tungsten from said ore in the form of a tungster-containing complex which is soluble in the reaction mixture, and recovering the tungsten from said tungsten-containing complex.

2. The process of claim 1 wherein said process is conducted at a pH less than about 7.

3. The process of claim 1 wherein said scheelite ore is roasted in air to drive off volatiles prior to its addition to said reaction mixture.

4. The process of claim 1 wherein said scheelite ore is ground to —120 mesh.

5. A process for removing tungsten from scheelite ore, said process comprising contacting scheelite ore in a finely divided state in an aqueous medium with hydrogen fluoride or the sodium or potassium salts thereof at a pH ranging from about —1 to about 14 for a sufficient time to remove tungsten from said ore in the form of a tungsten-containing complex which is soluble in the reaction mixture, and then reacting said soluble tungsten-containing complex with a water-soluble, monovalent sulfide at a pH less than about 7 to precipitate tungsten as an insoluble sulfide.

6. The process of claim 5 wherein said soluble monovalent sulfide is sodium sulfide.

7. A process for removing tungsten from scheelite ore, said process comprising contacting scheelite ore in a finely divided state in an aqueous medium with hydrogen fluoride or the sodium or potassium salts thereof at a pH less than about 7 to about −1 for a sufficient time to remove tungsten from said ore in the form of a tungsten-containing complex which is soluble in the reaction mixture, and then reacting the soluble tungsten-containing complex with a water-soluble monovalent sulfide at a pH less than about 7 to precipitate tungsten as an insoluble sulfide.

8. The process of claim 7 wherein said soluble monovalent sulfide is sodium sulfide.

9. A process for removing tungsten from scheelite ore, said process comprising contacting scheelite ore in a finely divided state in an aqueous medium with an oxy acid or the sodium or potassium salts thereof at a pH ranging from about −1 to about 14 for a sufficient time to remove tungsten from said ore in the form of a tungsten-containing complex which is soluble in the reaction mixture, said oxy acid or the sodium or potassium salt thereof being capable of precipitating calcium as an insoluble salt in the reaction of a one molar aqueous solution of the oxy acid or its potassium or sodium salt with a one molar solution of calcium carbonate, and said oxy acid or the sodium or potassium salt thereof being capable of forming a soluble complex with the tungstate anion in the reaction of one molar solution of said oxy acid or sodium or potassium salt thereof with one molar solution of sodium tungstate, at a pH of about 2 to 12, and then contacting said soluble complex with a water-soluble aluminum salt at a pH of at least about 6 or higher in the presence of phosphate or pyrophosphate ions or mixtures thereof to precipitate tungsten in the form of an insoluble complex.

10. The process of claim 9 wherein said water-soluble aluminum salt is aluminum chloride.

11. The process of claim 9 wherein said phosphate or pyrophosphate ions are provided by said oxy acid or said salt thereof.

12. The process of claim 9 wherein said scheelite ore is reacted with said oxy acid or the sodium or potassium salts thereof at a pH of at least about 6 or higher.

References Cited
UNITED STATES PATENTS

| | | | |
|---|---|---|---|
| 2,815,263 | 12/1957 | Eldredge | 23—19 R |
| 2,802,718 | 8/1957 | Zotos | 23—15 W |
| 2,942,940 | 6/1960 | Osthoff | 23—18 |
| 1,322,485 | 11/1919 | Ekeley et al. | 23—15 W |
| 2,394,362 | 2/1946 | Burwell | 23—15 W |
| 2,556,255 | 6/1951 | Carosella | 23—15 W |
| 1,399,705 | 12/1921 | Ekeley et al. | 23—15 W |

HERBERT T. CARTER, Primary Examiner

U.S. Cl. X.R.

423—55, 53; 75—101 R, 121